United States Patent [19]

Hirai et al.

[11] 4,036,804

[45] July 19, 1977

[54] ADHESIVE COMPOSITION

[75] Inventors: Seizaburo Hirai, Takatsuki; Yoji Mizoe, Kyoto; Itoh Koji, Amagasaki, all of Japan

[73] Assignee: Nippon Paint Co., Ltd., Osaka, Japan

[21] Appl. No.: 603,629

[22] Filed: Aug. 11, 1975

[30] Foreign Application Priority Data

Aug. 12, 1974 Japan .................................. 49-92648

[51] Int. Cl.$^2$ ....................... C08L 11/02; C08L 13/02
[52] U.S. Cl. ......................... 260/29.7 SQ; 260/29.7 H
[58] Field of Search .................... 260/29.7 H, 29.7 SQ

[56] References Cited

U.S. PATENT DOCUMENTS

| 3,055,855 | 9/1962 | Anderson et al. | 260/29.7 H |
|---|---|---|---|
| 3,317,451 | 5/1967 | Apotheker | 260/29.7 SQ |
| 3,912,676 | 10/1975 | Brizzolara et al. | 260/29.7 H |
| 3,920,600 | 11/1975 | Ahramjiam | 260/29.7 H |
| 3,920,769 | 11/1975 | Yaginuma et al. | 260/29.7 H |

*Primary Examiner*—M. J. Welsh
*Attorney, Agent, or Firm*—Wenderoth, Lind & Ponack

[57] ABSTRACT

An adhesive composition for bonding a rubber material onto a metal substrate, which comprises (1) an aqueous solution or dispersion of an elastic high molecular compound having a carboxyl group, (2) a vulcanizing agent and (3) a vulcanization accelerator.

8 Claims, No Drawings

ADHESIVE COMPOSITION

The present invention relates to an adhesive composition for bonding a rubber material onto a metal substrate. More particularly, it relates to an adhesive composition for simultaneously achieving vulcanization of an unvulcanized rubber and adhesion of the rubber material therefrom to a metal substrate.

The combination of a rubber material of high elongation, low modulus of elasticity and excellent chemical resistance onto a metal substrate of low elongation, high modulus of elasticity and high tensile strength has widely been adopted in the production of industrial materials such as conveyer belts, rubber vibration insulators, hoses and steel radial tires, because the combined materials have various advantageous properties.

In such a combination, it is very important to assure a good adhesion between the rubber material and the metal substrate, and there have been proposed various bonding methods such as a brass plating method, isocyanate method, ebonite method, chlorinated rubber adhesive agent method, cyclized rubber method and rubber latex/albumin method. However, these methods have certain drawbacks.

For instance, in the brass plating method, a strong adhesion is assured due to the chemical combination between brass and sulfur, and the resulting adhesion is excellent in resistance to heat, impact and vibration. However, the control of the brass plating method is difficult, and the use of expensive equipments is needed. Moreover, after being discarded, the brass plating bath which contains an extremely toxic agent may cause a troublesome pollution problem. In addition, rust is apt to be produced on the brass plated surface, whereby a firm adhesion of a rubber material thereto is prevented. Further, for instance, the isocyanate method using a solution of a polyisocyanate (e.g., p,p',p"-triphenylmethane triisocyanate, p,p'-diphenylmethane diisocyanate) with or without a rubber material (e.g., chlorinated rubber, chloroprene rubber) in a solvent such as methylene chloride can assure an excellent adhesion, but it causes a problem with regards to human health and air pollution due to the polyisocyanate and the solvent used therein. The rubber latex/albumin method does not have the drawbacks seen in the brass plating method and the isocyanate method, but the adhesive strength is so low as to be practically unsatisfactory.

As a result of extensive study, it has been found that an adhesive composition which comprises an elastic high molecular compound having a carboxylic group can assure a high adhesive strength of the bonding between a metal substrate and a rubber material without any of the drawbacks seen in conventional methods.

According to the present invention, there is provided an adhesive composition which comprises (1) an aqueous solution or dispersion of an elastic high molecular compound having a carboxyl group, (2) a vulcanizing agent and (3) a vulcanization accelerator.

The elastic high molecular compound may be any elastic polymer having a carboxyl group at the side chain. Examples of the aqueous solution or dispersion of such elastic high molecular compound are as follows:

a. Rubber latex obtained by copolymerizing at least one polymerizable monomer having a carboxyl group (e.g., acrylic acid, methacrylic acid, maleic acid, itaconic acid) with at least one polymerizable monomer conventionally employed for the production of rubber lattices (e.g., styrene, butadiene, chloroprene, acrylonitrile, isoprene) in an aqueous medium;

b. Rubber latex obtained by reacting a natural or synthetic rubber latex with a carboxyl group-introducing agent such as thioglycolic acid so as to introduce a carboxyl group therein;

c. Rubber varnish obtained by subjecting an elastic polymer (e.g., polybutadiene, polyisoprene, polypentadiene, styrene-butadiene copolymer) having a degree of polymerization of not more than about 5,000 (so-called "liquid rubber") to maleic reaction so as to introduce a carboxyl group therein and neutralizing the resulting product with an amine (e.g., triethylamine), followed by dissolving into water, etc.

In the adhesive composition of the invention, one or more kinds of the aqueous solutions or dispersions as mentioned above may be included. Particularly advantageous is the combined use of at least one of the rubber lattices (a) and (b) with at least one of the rubber varnishes (c), because such combination assures a high adhesive strength and an excellent resistance to heat and water.

The said rubber lattices and varnishes are commercially available, and examples of their commercial products are as follows: carboxyl-modified (or carboxylated) medium styrene SBR latex (e.g., NIPOL LX-407, NIPOL LX-411, NIPOL LX-415, NIPOL LX-416, NIPOL LX-420, NIPOL LX-430, HYCAR 2570x5, etc., (trade names) made by Nippon Zeon Co., LTd.), carboxyl-modified SBR latex (e.g., JSR 0667, JSR 0668, JSR 0669, JSR 0691, JSR 0591, etc., (trade names) made by Japan Synthetic Rubber Co., Ltd.), carboxylmodified medium styrene SBR latex (e.g., CROSLENE SA-20, CROSLENE SA-21, CROSLENE SA-25, etc., (trade names) made by Takeda Chemical Ind. Ltd.), carboxylated NBR latex (e.g., NITREX 2614, NITREX 2615, etc. (trade names) made by Sumitomo Naugatuck Co., Ltd.), maleic polybutadiene rubber (e.g., M287, M283, M296, etc., (trade names) made by Nippon Petrochemicals Co., Ltd.; used by neutralizing the rubber with an amine and dissolving the neutralized rubber into water to make a rubber varnish), etc.

The terms "SBR" and "NBR" are the abbreviations of styrene-butadiene rubber and nitrile-butadiene rubber, respectively.

The carboxyl content in the elastic high molecular compound may be from about $1 \times 10^{-4}$ mol/g, preferably from about $2 \times 10^{-4}$ to $30 \times 10^{-4}$ mol/g. In case two or more kinds of the elastic high molecular compound are used, the average carboxyl content may fall within the above range. When the carboxyl content is lower than the said lower limit, the polarity of the elastic high molecular compound is too low and adhesion between the rubber material and the metal substrate is lowered with the decrease of the peel strength. When the carboxyl content is higher than the said upper limit, the adhesion between the adhesive composition and the rubber material is made inferior with lowering of the elasticity of the elastic high molecular compound and resistance of the adhesion to vibration and impact deteriorates.

The aqueous solution or dispersion of the elastic high molecular compound may be, if necessary, incorporated with any conventional rubber lattex such as natural rubber latex, vinylpyridine SBR latex, SBR latex, NBR latex or CR (chloroprene rubber) latex. Particularly when a rubber latex of the same kind as the unvulcanized rubber to be bonded on the metal substrate is used, the self-bonding property of the unvulcanized rubber is increased and the interfacial adhesion between the layer of the adhesive composition and the layer of the unvulcanized rubber becomes stronger. In addition, the permissible range of time and temperature for drying the adhesive composition can be broadened. The amount of such rubber latex to be incorporated into the aqueous solution or dispersion of the elastic high molecular compound may be not more than about 90% by weight (in terms of the resinous solid component) based on the total weight of the resinous solid component in the adhesive composition. When the amount is higher than about 90% by weight, the adhesive property of the adhesive composition to the metal substrate is deteriorated. Still, the carboxyl content attributed to the elastic high molecular compound should be fallen within the range of from about $1 \times 10^{-4}$ to $40 \times 10^{-4}$ mol to one gram of the total resinous solid component in the adhesive composition when the said conventional latex is incorporated.

A compound of the following formula may be also incorporated into the aqueous solution or dispersion of the elastic high molecular compound:

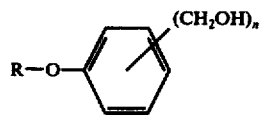

wherein R is an alkyl group having at least one double bond (preferably containing not more than 8 carbon atoms) and $n$ is an integer of 1 to 3. Examples of such compound are the formaldehyde adduct of phenyl allyl ether (METHYLONE (trade name) by General Electric Co.), the formaldehyde adduct of phenyl butadienyl ether, etc. These compounds are effective in enhancing the adhesion between the adhesive composition and the metal substrate and improving the adhesive strength at an elevated temperature. The amount of these compounds to be incorporated into the adhesive composition may be not more than about 30% by weight based on the total weight of the resinous solid component in the adhesive composition. When the amount exceeds such limit, the time required for drying the adhesive composition becomes longer and the adhesive strength is lowered. Still, the carboxyl content attributed to the elastic high molecular compound should fall within the range of from about $1 \times 10^{-4}$ to $40 \times 10^{-4}$ mol to 1 gram of the total resinous solid component in the adhesive composition when the said compound is incorporated.

The total resinous solid content in the adhesive composition of the invention may be from about 1 to 50% by weight based on the weight of the adhesive composition.

The vulcanizing agent and the vulcanization accelerator are used for the purposes of increasing the adhesive strength of the adhesive composition and of adjusting the vulcanization rate of the adhesive composition to that of the unvulcanized rubber. They may be any conventional ones. Examples of the vulcanization agent are sulfur, thiurams (e.g., tetramethylthiuram disulfide, tetraethylthiuram disulfide), dimorpholine, disulfides, etc. Examples of the vulcanization accelerator are thiazoles (e.g., 2-mercaptobenzothiazole, dibenzothiazyldisulfide, 2-mercaptobenzothiazole zinc or sodium salt), sulfenamides (e.g., cyclohexylsulfenamide, t-butylsulfenamide, diethylsulfenamide, diisopropylsulfenamide), thiurams (e.g., tetramethylthiuram disulfide, tetraethylthiuram disulfide, tetrabutylthiuram disulfide, dipentamethylenethiuram tetrasulfide), dithiocarbamates (e.g., zinc dimethyldithiocarbamate, zinc di-n-butyldithiocarbamate, sodium diethyldithiocarbamate), guanidines (e.g., diphenylguanidine, di-o-tolylguanidine), thioureas (e.g., ethylenethiourea, trimethylthiourea), xanthates (e.g., zinc dibutylxanthate, zinc isopropylxanthate), aldehyde-ammonia compounds (e.g., hexamethylenetetramine), aldehyde-amine compounds (e.g., acetaldehyde-aniline), etc. The amounts of the vulcanizing agent and the vulcanization accelerator to be incorporated into the adhesive composition may be respectively from about 0.1 to 10 parts by weight, preferably from about 0.5 to 5 parts by weight, to 100 parts by weight of the combined amount of the elastic high molecular compound and, if used, the resinous solid component in the conventional rubber latex having no carboxyl group.

For preparation of the adhesive composition of the invention, the aqueous solution or dispersion of the elastic high molecular compound, the vulcanizing agent and the vulcanization accelerator may be mixed together according to a conventional procedure adopted for preparation of a latex composition. For instance, the vulcanizing agent and the vulcanization accelerator are charged with an appropriate amount of water containing a surface active agent in a dispersing apparatus such as a ball mill, and the resulting mixture is added to the aqueous solution or dispersion of the elastic high molecular compound while stirring so as to give a uniform adhesive composition. When the vulcanizing agent and/or the vulcanization accelerator are water-soluble, they may be as such admixed with the aqueous solution or dispersion of the elastic high molecular compound, followed by agitation.

For bonding a rubber material onto a metal substrate by the use of the adhesive composition of the invention, the adhesive composition may be applied to the surface of the metal substrate by a conventional procedure such as spraying, immersing or brushing, followed by drying at a temperature of about 150° to 180° C for about 3 to 10 minutes to form a dried adhesive layer of about 4 to 8 μ thick. A sheet of an unvulcanized rubber is placed on the adhesive layer and subjected to vulcanization under pressure, whereby the unvulcanized rubber and the adhesive layer are vulcanized simultaneously to make a firm bonding.

The adhesive composition of the invention may be used for achieving a bond between various metal substrates (e.g., iron and its alloy, stainless steel, aluminum and its alloy, zinc, brass) and various rubber materials (e.g., natural rubber, SBR, NBR, CR, IR (isoprene rubber), IIR (isobutene-isoprene rubber), BR (butadiene rubber)). The bonding achieved has such an excellent adhesion and durability as to be suitable for use under extremely stern conditions such as adhesion between the cord and the rubber in a steel radial tire. It is highly resistant to impact, vibration, heat and water. The formation of the adhesive layer can be accomplished by a conventional application procedure, and no special consideration need be given to the preservation of the formed adhesive layer as required in the case of the brass plating method. The desired bonding can be achieved with the thickness of the adhesive layer being about 4 to 8 μ. Since the adhesive composition of the invention is aqueous, safety and sanitation in its use are sufficiently guaranteed.

Practical and presently preferred embodiments of the present invention are illustratively shown in the following Examples wherein parts and % are by weight.

The carboxyl content of the elastic high molecular compound in the rubber latex or varnish is determined by measuring the acid value of such latex or varnish according to the method described in JIS (Japanese Industrial Standard) K5400-8.5.1 A. But, in case of the rubber latex, distilled water is used in place of an ethanol and toluene mixture as a solvent for dilution of the specimen, and excess of 0.1 N potassium hydroxide solution is added to the diluted specimen. The resulting solution is heated for 1 hour under reflux, and then back titration with 0.1 N sulfuric acid solution is carried out.

EXAMPLE 1

1. Adhesive composition:

Table 1

| Materials (part(s)) | | Adhesive composition No. | | | | |
|---|---|---|---|---|---|---|
| | | 1-1 | 1-2 | 1-3 | 1-4 | 1-5 |
| Rubber latex | Carboxyl-modified SBR latex1 | 210 | — | — | — | — |
| | Carboxyl-modified SBR latex2 | — | 250 | — | — | 250 |
| | Medium styrene SBR latex3 | — | — | 250 | — | — |
| | Modified acrylic ester copolymer latex4 | — | — | — | 223 | — |
| Colloidal sulfur | | 1 | 1 | 1 | 1 | — |
| Mercaptobenzothiazole | | 2 | 2 | 2 | 2 | — |
| Zinc isopropyl xanthate | | 2 | 2 | 2 | 2 | — |
| Water | | 115 | 75 | 75 | 105 | 80 |

Note:
[1]NIPOL LX-407 (trade name) made by Nippon Zeon Co., Ltd.; acid value, 27.4; resinous solid content, 49 %.
[2]HYCAR-2570 x 5 (trade name) made by Nippon Zeon Co., Ltd.; acid value, 31.3; solid content, 40 %; viscosity, about 25 cp.
[3]HYCAR-LX-204 (trade name) made by Nippon Zeon; acid value, 1.2; resinous solid content, 41 %; viscosity, about 15 cp.
[4]NIPOL LX-812 (trade name) made by Nippon Zeon; acid value, 4.3; resinous content, 45 %.

Colloidal sulfur, mercaptobenzothiazole and zinc isopropyl xanthate are dispersed into water containing a small amount of a nonionic surface active agent (fatty acid ethylene oxide condensate; DEMOL-P (trade name) made by Kao Atlas Co., Ltd.) in a ball mill at room temperature for 24 hours, after which the resulting mixture is mixed with the rubber latex.

2. Unvulcanized rubber:

| Materials | Part(s) |
|---|---|
| Low styrene SBR1 | 70 |
| Natural rubber | 30 |
| Zinc white | 5.0 |
| Stearic acid | 2.0 |
| Carbon black HAF | 40 |
| Calcium carbonate | 30 |
| Naphthenic process oil | 3.0 |
| Isoparaffinic microcrystalline wax | 1.0 |
| N-Phenyl-β-naphthylamine | 1.0 |
| N-Phenyl-N-isopropyl-p-phenylenediamine | 1.0 |
| Cyclohexylbenzothiazolesulfenamide | 1.0 |
| Sulfur | 2.5 |

Note:
[1]JSR No. 1502 (trade name) made by Japan Synthetic Rubber Co., Ltd.; styrene content, 23.5 %.

The above materials are mixed and kneaded with a Bumbury's mixer at room temperature for 1 hour and then further kneaded with twin roll, followed by molding into a sheet form (about 5 mm thick).

3. Adhesion:

A mild steel plate of 100 x 100 x 0.3 mm in size is degreased by washing with vaporized trichloroethylene, and its lower part for 70 to 80 mm is dipped in the adhesive composition prepared in (1), after which it is drawn up and dried in a hot wind drying furnace at 180° C for 5 minutes. The thickness of the thus formed adhesive layer is 3 to 8 μ. The resulting plate is cut into 25 mm wide to prepare test pieces.

The test piece as above prepared is placed on the bottom area of a box type steel mold, and the unvulcanized rubber sheet obtained in (2) is placed on the whole surface of the test piece. The resulting laminate is heated and pressed with a press set at 160° C under a pressure of 50 kg/cm$^2$ for 30 minutes. After cooling, the laminate is taken out, cut into the size of the above test piece and subjected to an adhesive strength test. The adhesive strength is evaluated by the T-peel test with a Tensilon tension tester made by Toyo Baldwin Co., Ltd. at 20° C at a pulling rate of 100 mm/min.

The results are shown in Table 2.

Table 2

| Adhesive composition No. | T-peel strength (kg/25 mm) | State of breakage[2] |
|---|---|---|
| 1-1 | 35 | R: 60 %; RC: 40 % |
| 1-2 | 43 | R: 75 %; RC: 25 % |
| 1-3 | 7 | M: 100 % |
| 1-4 | 4 | RC: 100 % |
| 1-5 | 11 | RC: 100 % |
| Chlorinated rubber adhesive composition1 | 44 | R: 100 % |

Note:
[1]METALOCK G (trade name) made by Toyo Kagaku Research Institute.
[2]R: Breakage by cohesion of the rubber layer; RC: breakage of the interface between the rubber layer and the adhesive layer; M: breakage of the interface between the adhesive layer and the metal substrate.

As apparent from the above, the adhesive compositions of the invention (Nos. 1-1 and 1-2) show such a strong adhesion as to cause breakage to the rubber layer, but the adhesive compositions for comparison (Nos. 1-3, 1-4 and 1-5) cause breakage to the interface between the adhesive layer and the rubber layer or the metal substrate, showing a low adhesion.

EXAMPLE 2

Excepting the use of the following adhesive composition, the operation and the test are carried out in the same manner as in Example 1:

| Materials | Part(s) |
|---|---|
| Carboxyl-modified SBR latex1 | 170 |
| Maleic polybutadiene varnish2 | 100 |
| Colloidal sulfur | 1 |
| Mercaptobenzothiazole | 2 |
| Zinc isopropyl xanthate | 2 |
| Water | 55 |

Note:
[1]NIPOL LX-407 (trade name) made by Nippon Zeon Co., Ltd.; acid value, 27.4; resinous solid content, 49 %.
[2]Prepared by heating a mixture of 1,4-polybutadiene of about 1,000 in molecular weight (252 g), maleic anhydride (48 g) and 5 % xylene solution of copper naphthenate (1.6 g) while stirring in nitrogen atmosphere at 260° C for 3 hours and, after cooling, adding triethylamine (48 g) and water thereto to make 20 % varnish; acid value, 141.5.

The results are shown in Table 3.

Table 3

| Temperature measured (° C) | T-peel strength (kg/25 mm) | Stage of breakage |
|---|---|---|
| 20 | 51 | R: 80 %, RC: 20 % |

Table 3-continued

| Temperature measured (° C) | T-peel strength (kg/25 mm) | Stage of breakage |
|---|---|---|
| 140 | 14 | R: 60 %, RC: 10 % M: 30 % |
| 160 | 6 | M: 100 % |

As apparent from the above, the adhesive composition of the invention displays a strong heat-resistant adhesion, showing the breakage of the rubber layer even at 140° C.

Example 3

1. Adhesive composition:

Table 4

| Materials (part(s)) | | Adhesive composition No. | | | |
|---|---|---|---|---|---|
| | | 3-1 | 3-2 | 3-3 | 3-4 |
| Rubber latex | Carboxyl-modified SBR latex1 | 147 | 147 | 147 | 147 |
| | Vinylpyridine SBR latex2 | 75 | — | — | — |
| | Natural rubber latex3 | — | 79 | — | — |
| | Low styrene SBR latex4 | — | — | 48 | — |
| | Chloroprene latex5 | — | — | — | 60 |
| Colloidal sulfur | | 1 | 1 | 1 | 1 |
| Mercaptobenzothiazole | | 2 | 2 | 2 | 2 |
| Zinc isopropyl xanthate | | 2 | 2 | 2 | 2 |
| Water | | 103 | 99 | 130 | 118 |

Note:
[1]NIPOL LX-407 (trade name) made by Nippon Zeon Co., Ltd.; acid value, 27.4; resinous solid content, 49 %.
[2]HYCAR-2518 FS (trade name) made by Nippon Zeon Co., Ltd; solid content, 40.5 %; viscosity, about 35 cp.
[3]Ammonia added; resinous solid content, 38 %.
[4]HYCAR-4850 (trade name) made by Nippon Zeon Co., Ltd.; resinous solid content, 63 %, viscosity, 230 cp.
[5]DENKA CHLOROPRENE LATEX LM-50 (trade name) made by Denki Kagaku Kogyo K.K.; resinous solid content, 50 %.

Colloidal sulfur, mercaptobenzothiazole and zinc isopropyl xanthate are dispersed into water containing a small amount of a nonionic sulface active agent (fatty acid ethylene oxide condensate; DEMOL-P (trade name) made by Kao Atlas Co., Ltd.) in a ball mill at room temperature for 24 hours, after which the resulting mixture is mixed with the rubber latex.

2. Rubber compound:

| Unvulcanized rubber compound | |
|---|---|
| Same as used in Example 1. | |
| Natural rubber compound | |
| Materials | Part(s) |
| Natural rubber | 100 |
| Stearic acid | 2 |
| Zinc white | 5 |
| Sulfur | 2.3 |
| N-Oxydiethylenebenzothiazole-2-sulfenamide | 0.4 |
| Polymer of trimethyldihydroquinoline | 2 |
| Naphthenic process oil | 1 |
| Carbon black FET | 15 |
| Carbon black SRF | 10 |
| Chloroprene rubber compound | |
| Materials | Part(s) |
| Chloroprene rubber1 | 100 |
| Zinc white | 5 |
| Magnesium oxide | 4 |
| Stearic acid | 0.5 |
| 2-Mercaptoimidazoline | 0.5 |
| Carbon black SRF | 50 |
| N-Phenyl-β-Naphthylamine | 2 |

3. Adhesion:
As in Example 1, a metal substrate and the rubber compound obtained in (2) are adhered by the aid of the adhesive composition obtained in (1), and the tests for T-peel strength and state of breakage are carried out.
The results are shown in Table 5.

Table 5

| Adhesive composition No. | Test | Rubber Compound | | |
|---|---|---|---|---|
| | | Unvulcanized rubber compound | Natural rubber compound | Chloroprene rubber compound |
| 3-1 | T-peel strength (kg/25 mm) | 58 | 52 | 31 |
| | State of breakage | R: 100% | R: 100% | R: 90% RC: 10% |
| 3-2 | T-peel strength (kg/25 mm) | 37 | 63 | 17 |
| | State of breakage | R: 70% RC: 30% | R: 100% | R: 35% RC: 65% |
| 3-3 | T-peel strength (kg/25 mm) | 44 | 18 | 4 |
| | State of breakage | R: 80% RC: 20% | R: 15% RC: 85% | RC: 100% |
| 3-4 | T-peel strength (kg/25 mm) | 27 | 13 | 45 |
| | State of breakage | R: 30% RC: 70% | R: 15% RC: 85% | R: 90% RC: 10% |

As apparent from the above, the adhesive strength is increased by incorporating into the adhesive composition the same kind of the rubber latex as the unvulcanized rubber compound to be adhered.

EXAMPLE 4

Excepting the use of a stainless steel plate, a brass plate, an aluminum plate, a zinc plated iron plate or a copper plate, the operation and the test are carried out in the same manner as in Example 3 using the adhesive composition No. 3-1.
The results are shown in Table 6.

Table 6

| Metal substrate | Surface treatment | T-peel strength (kg/25 mm) | State of breakage |
|---|---|---|---|
| Stainless steel plate (0.5 mm thick) | Washed with vaporized trichloroethylene | 74 | R 70% RC: 30% |
| Brass plate (zinc:copper = 30:70 by weight) (0.4 mm thick) | Washed with vaporized trichloroethylene, followed by sanding | 66 | R: 95% RC: 5% |
| Aluminum plate (0.25 mm thick) | Treated with chlomate | 47 | R: 90% RC: 10% |
| Zinc plated iron plate (0.27 mm thick) | Washed with vaporized trichloroethylene, followed by sanding | 45 | R: 95% RC: 5% |
| Copper plate (0.3 mm thick) | Washed with vaporized trichloroethylene, followed by sanding | 3 | RC: 25% M: 75% |

EXAMPLE 5

Using the adhesive composition No. 1-2 or a chlorinated rubber adhesive composition ("METALOCK G" (trade name) made by Toyo Kagaku Research Institute), a test piece is prepared in the same manner as in Example 1.
As impact is applied to the face of the mild steel plate of the test piece placed upward by the use of a DuPont type impact tester (½ × 500 g × 50 cm), and the test piece is subjected to the tests for T-peel strength and state of breakage.

The results are shown in Table 7

Table 7

| Adhesive composition No. | T-peel strength (kg/25 mm) Before impact | T-peel strength (kg/25 mm) After impact | Strength retention rate (%) | State of breakage Before impact | State of breakage After impact |
|---|---|---|---|---|---|
| 1-2 | 44 | 42 | 95.4 | R: 80% RC: 20% | R: 80% RC: 20% |
| Chlorinated rubber adhesive composition | 43 | 141 | 32.5 | R: 100% | R: 50% RC: 50% |

[1]The positions which sustained impact fully showed peeling on the iron interface.

As apparent from the above, the adhesive composition of the invention is superior in impact strength to the conventional adhesive composition.

EXAMPLE 6

A test piece prepared as in Example 2 is dipped in warm water of 40° C for 10 days, after which it is subjected to the test for adhesion in the same manner as in Example 1. It shows 50 kg/25 mm in T-peel strength and does not indicate any deterioration in adhesive strength attributed to the dipping in warm water.

EXAMPLE 7

Excepting the use of the following adhesive composition, the operation and the test are carried out in the same manner as in Example 1:

Table 8

| Materials (part(s)) | | Adhesive composition No. 7-1 | Adhesive composition No. 7-2 |
|---|---|---|---|
| Rubber latex | Carboxyl-modified SBT latex[1] | 140 | 140 |
| | Vinylpyridine-modified SBR latex[2] | 50 | 50 |
| | Maleic polybutadiene varnish[3] | 10 | 10 |
| | Methylone[4] | 10 | 20 |
| Colloidal sulfur | | 1 | 1 |
| Mercaptobenzothiazole | | 2 | 2 |
| Zinc isopropylxanthate | | 2 | 2 |
| Water | | 50 | 50 |
| Methanol | | 100 | 100 |

Note:
[1]NIPOL LX-407 (trade name) made by Nippon Zeon Co., Ltd.; acid value, 27.4; resinous solid content, 49 %.
[2]HYCAR-2518 FS (trade name) made by Nippon Zeon Co., Ltd.; solid content, 40.5 %; viscosity, about 35 cp.
[3]Prepared by heating a mixture of 1,4-polybutadiene of about 1,000 in molecular weight (252 g), maleic anhydride (48 g) and 5 % xylene solution of copper naphthenate (1.6 g) while stirring in nitrogen atmosphere at 260° C for 3 hours and, after cooling, adding triethylamine (48 g) and water thereto to make 20 % varnish; acid value, 141.5.
[4]METHYLONE (trade name) made by General Electric Co.; solid content, 100 %; dissolved in methanol in an amount of 5 to 10 times by weight and added to the rubber latex.

The results are shown in Table 9.

Table 9

| Adhesive composition No. Temperature measured (° C) | 7-1 T-peel strength (kg/25 mm) | 7-1 State of breakage | 7-2 T-peel strength (kg/25 mm) | 7-2 State of breakage |
|---|---|---|---|---|
| 20 | 47 | R: 100% | 49 | R: 100% |
| 120 | 24 | R: 95% RC: 5% | 22 | R: 90% RC: 10% |
| 160 | 15 | R: 80% RC: 20% | 18 | R: 90% RC: 10% |

From the above, it is understood that the amount of the rubber adhesive to the metal substrate on breakage is increased and the heat resistant adhesive property is good even at 160° C.

As stated above, various elastic high molecular compounds having a carboxyl group are utilizable in the adhesive composition of the invention. The most favorable results in adhesion are presently obtainable by the use of carboxylated medium styrene SBR rubber (styrene content, 20 to 70% by weight; molecular weight, 50,000 to 500,000; carboxyl content, $1 \times 10^{-4}$ to $40 \times 10^{-4}$ mol/g) or maleic polybutadiene rubber (molecular weight, 500 to 3,000; carboxyl content, $1 \times 10^{-4}$ to $40 \times 10^{-4}$ mol/g), particularly by the combined use of them in a proportion of 100 : 5 − 30 by weight.

What is claimed is:

1. An adhesive resinous composition for bonding an unvulcanized rubber material onto a metal substrate which comprises (1) an aqueous solution or dispersion of an elastic high molecular weight compound having carboxyl groups in its structure in such amounts that the carboxyl groups are present in amounts of from about $1 \times 10^{-4}$ to $40 \times 10^{-4}$ mol per 1 gram of the total resinous content in the composition, (2) a vulcanizing agent in an amount of 0.1 to 10% by weight, based on the weight of the elastic high molecular weight compound and (3) a vulcanizing accelerator to adjust the vulcanization rate of the adhesive composition to that of the unvulcanized rubber in an amount of 0.1 to 10% by weight of the elastic high molecular weight compound; wherein the resinous solid content is present in an amount of from about 1–50% by weight, based on the weight of the adhesive composition.

2. The adhesive composition according to claim 1, which comprises as the elastic high molecular weight compound a carboxylated medium styrene-butadiene rubber having a styrene content of 20 to 70% by weight, a molecular weight of 50,000 to 500,000 and a carboxyl content of $1 \times 10^{-4}$ to $40 \times 10^{-4}$ mol/g based on the weight of the elastic high molecular weight compound.

3. The adhesive composition according to claim 1, which comprises as the elastic high molecular weight compound a maleic polybutadiene rubber having a molecular weight of 500 to 3,000 and a carboxyl content of $1 \times 10^{-4}$ to $40 \times 10^{-4}$ mol/g based on the weight of the elastic high molecular weight compound.

4. The adhesive composition according to claim 1, which comprises as the elastic high molecular weight compound a mixture of a carboxylated medium styrene-butadiene rubber having a styrene content of 20 to 70% by weight, a molecular weight of 50,000 to 500,000 and a carboxyl content of $1 \times 10^{-4}$ to $40 \times 10^{-4}$ mol/g based on the weight of the elastic high molecular weight compound and a maleic polybutadiene rubber having a molecular weight of 500 to 3,000 and a carboxyl content of $1 \times 10^{-4}$ to $40 \times 10^{-4}$ mol/g based on the weight of the elastic high molecular weight compound in a weight ratio of 100 : 5–30 by weight.

5. An adhesive resinous composition according to claim 1, wherein the vulcanizing agent is selected from the group consisting of sulfur, tetramethylthiuram disulfide, tetraethylthiuram disulfide and dimorpholine, and the vulcanizing accelerator is selected from the group consisting of 2-mercaptobenzothiazole, dibenzothiazyldisulfide, the zinc or sodium salt of 2-mercaptobenzothiazole, cycloehexylsulfenamide, t-butylsulfenamide, diethylsulfenamide, diisopropylsulfenamide, tetramethylthiuram disulfide, tetraethylthiuram disulfide, tetrabutylthiuram disulfide, dipentamethylenethiuram tetrasulfide, zinc dimethyldithiocarbamate, zinc di-n-butyldithiocarbamate, sodium diethyldithiocarbamate, diphenylguanidine, di-o-tolylguanidine, ethylenethiourea, trimethylthiourea, zinc dibutylxanthate, zinc isopropylxanthate, hexamethylenetetramine and acetaldehyde-analine.

6. An adhesive resinous composition according to claim 2, wherein the vulcanizing agent is selected from the group consisting of sulfur, tetramethylthiuram disulfide, tetraethylthiuram disulfide and dimorpholine, and the vulcanizing accelerator is selected from the group consisting of 2-mercaptobenzothiazole, dibenzothiazyldisulfide, the zinc or sodium salt of 2-mercaptobenzothiazole, cyclohexylsulfenamide, t-butylsulfenamide, diethylsulfenamide, diisopropylsulfenamide, tetramethylthiuram disulfide, tetraethylthiuram disulfide, tetrabutylthiuram disulfide, dipentamethylenethiuram tetrasulfide, zinc dimethyldithiocarbamate, zinc di-n-butyldithiocarbamate, sodium diethyldithiocarbamate, diphenylguanidine, di-o-tolylguanidine, ethylenethiourea, trimethylthiourea, zinc dibutylxanthate, zinc isopropylxanthate, hexamethylenetetramine and acetaldehyde-analine.

7. An adhesive resinous composition according to claim 3, wherein the vulcanizing agent is selected from the group consisting of sulfur, tetramethylthiuram disulfide, tetraethylthiuram disulfide and dimorpholine, and the vulcanizing accelerator is selected from the group consisting of 2-mercaptobenzothiazole, dibenzothiazyldisulfide, the zinc or sodium salt of 2-mercaptobenzothiazole, cyclohexylsulfenamide, t-butylsulfenamide, diethylsulfenamide, diisopropylsulfenamide, tetramethylthiuram disulfide, tetraethylthiuram disulfide, tetrabutylthiuram disulfide, dipentamethylenethiuram tetrasulfide, zinc dimethyldithiocarbamate, zinc di-n-butyldithiocarbamate, sodium diethyldithiocarbamate, diphenylguanidine, di-o-tolylguanidine, ethylenethiourea, trimethylthiourea, zinc dibutylxanthate, zinc isopropylxanthate, hexamethylenetetramine and acetaldehyde-analine.

8. An adhesive resinous composition according to claim 4, wherein the vulcanizing agent is selected from the group consisting of sulfur, tetramethylthiuram disulfide, tetraethylthiuram disulfide and dimorpholine, and the vulcanizing accelerator is selected from the group consisting of 2-mercaptobenzothiazole, dibenzothiazyldisulfide, the zinc or sodium salt of 2-mercaptobenzothiazole, cyclohexylsulfenamide, t-butylsulfenamide, diethylsulfenamide, diisopropylsulfenamide, tetramethylthiuram disulfide, tetraethylthiuram disulfide, tetrabutylthiuram disulfide, dipentamethylenethiuram tetrasulfide, zinc dimethyldithiocarbamate, zinc di-n-butyldithiocarbamate, sodium diethyldithiocarbamate, diphenylguanidine, di-o-tolylguanidine, ethylenethiourea, trimethylthiourea, zinc dibutylxanthate, zinc isopropylxanthate, hexamethylenetetramine and acetaldehyde-analine.

* * * * *